US012670272B2

(12) United States Patent
Vijay et al.

(10) Patent No.: US 12,670,272 B2
(45) Date of Patent: Jun. 30, 2026

(54) SYSTEM AND METHOD FOR MULTI-PROTOCOL DATA PERMISSIONS QUERYING AND AGGREGATION

(71) Applicant: BANK OF AMERICA CORPORATION, Charlotte, NC (US)

(72) Inventors: Jitesh K. Vijay, Princeton, NJ (US); Annamalai Arunachalam, Singapore (SG); Frederick Borcherdt, III, Newark, DE (US); Ajai Kapur, Montville, NJ (US); Vishwanath Prasad Karra, McKinney, TX (US); William McNamara, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 92 days.

(21) Appl. No.: 18/905,423

(22) Filed: Oct. 3, 2024

(65) Prior Publication Data

US 2026/0099614 A1    Apr. 9, 2026

(51) Int. Cl.
*G06F 21/60* (2013.01)
*G06F 21/62* (2013.01)

(52) U.S. Cl.
CPC ........ *G06F 21/604* (2013.01); *G06F 21/6218* (2013.01); *G06F 2221/2113* (2013.01)

(58) Field of Classification Search
USPC .......................................................... 726/27
See application file for complete search history.

(56) References Cited

U.S. PATENT DOCUMENTS

| | | | |
|---|---|---|---|
| 7,584,222 B1 | 9/2009 | Georgiev | |
| 7,805,416 B1 | 9/2010 | Compton et al. | |
| 9,053,341 B2 | 6/2015 | Odnovorov et al. | |
| 9,516,028 B1 | 12/2016 | Andruschuk et al. | |
| 10,110,660 B2 | 10/2018 | Cooley | |
| 11,489,922 B1 | 11/2022 | Zelenov | |
| 11,615,082 B1* | 3/2023 | Shrigondekar ....... | G06F 16/245 707/769 |
| 11,636,181 B2 | 4/2023 | Bose et al. | |
| 11,704,423 B2 | 7/2023 | Poothokaran et al. | |
| 2005/0131871 A1 | 6/2005 | Howard et al. | |
| 2016/0065561 A1 | 3/2016 | Decrescenzo et al. | |

(Continued)

*Primary Examiner* — Sakinah White-Taylor
(74) *Attorney, Agent, or Firm* — Moore & Van Allen PLLC; Nicholas C. Russell

(57) ABSTRACT

Systems, computer program products, and methods are described herein for multi-protocol data permissions querying and aggregation. The present disclosure includes receiving an access link to a shared file, determining, by analyzing the access link, a sharing platform and corresponding storage repository associated with the access link, transmitting, to the storage repository via a network communication protocol, a query to retrieve sharing data associated with the shared file of the storage repository, retrieving the sharing data associated with the shared file of the storage repository, the sharing data including a list of a plurality of user identifiers having access to the shared file, and a permission type for each respective user identifier of the plurality of user identifiers for the shared file, and causing to display the list of the plurality of user identifiers and corresponding permission type for the respective user identifier of the plurality of user identifiers.

20 Claims, 6 Drawing Sheets

(56) References Cited

U.S. PATENT DOCUMENTS

| | | | |
|---|---|---|---|
| 2016/0156631 | A1 | 6/2016 | Viswanathan et al. |
| 2017/0243017 | A1 | 8/2017 | Angelo et al. |
| 2018/0041467 | A1* | 2/2018 | Vats ..................... H04L 9/0891 |
| 2020/0110854 | A1* | 4/2020 | Lilko ................... G06F 21/604 |
| 2021/0110328 | A1* | 4/2021 | Hsiao .................. G06F 16/2477 |
| 2022/0207170 | A1* | 6/2022 | Poothokaran ....... G06F 21/6227 |
| 2022/0382899 | A1 | 12/2022 | Wijayaratne et al. |
| 2022/0405245 | A1 | 12/2022 | Xu et al. |
| 2023/0014346 | A1* | 1/2023 | Goyal ..................... G06F 9/546 |
| 2023/0069077 | A1* | 3/2023 | Scott, II ............ G06F 16/24575 |
| 2023/0214508 | A1* | 7/2023 | Munisamy .............. G06F 21/10 |
| | | | 726/29 |
| 2023/0267225 | A1* | 8/2023 | Costello ............. G06F 21/6227 |
| | | | 726/27 |
| 2025/0005188 | A1* | 1/2025 | Sharma .............. G06F 21/6218 |

* cited by examiner

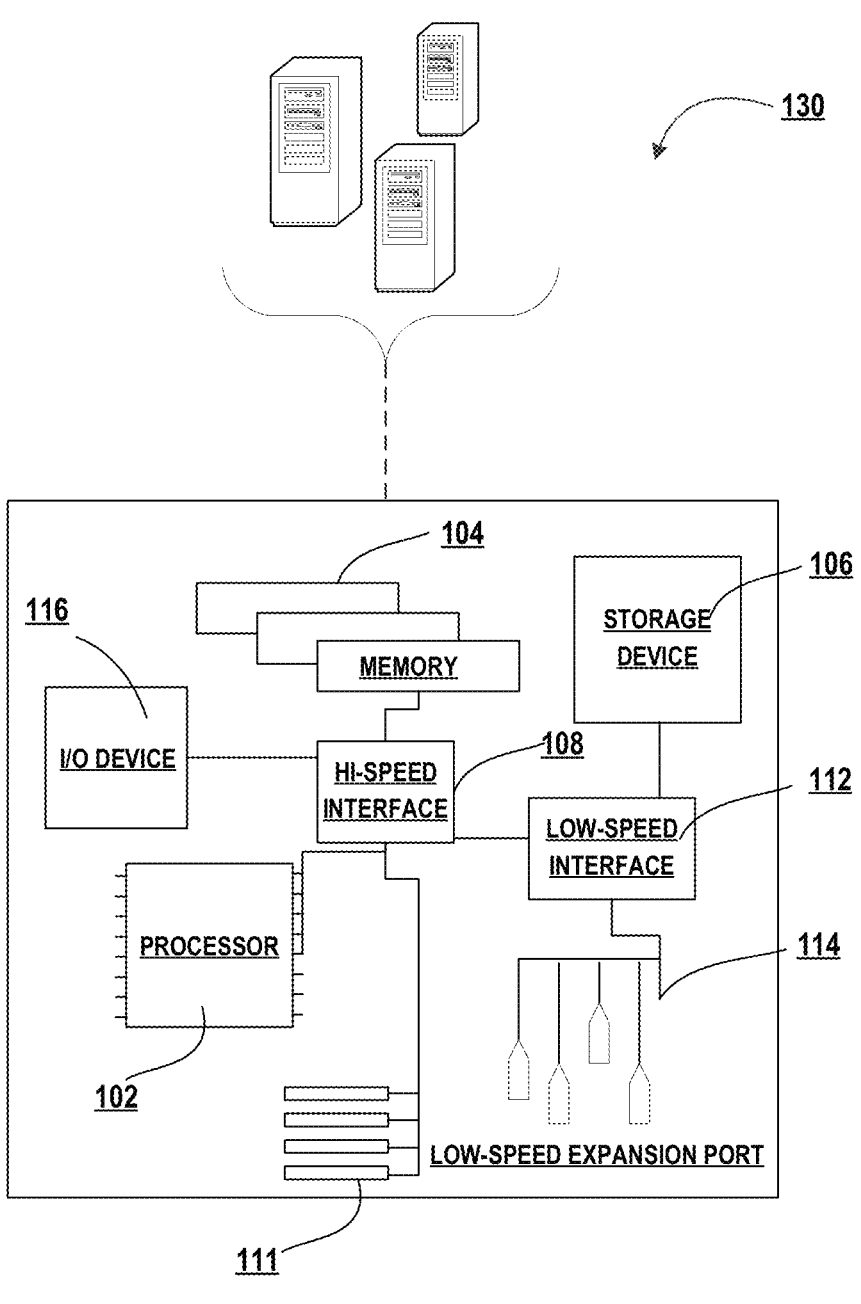
*FIG.* 1B

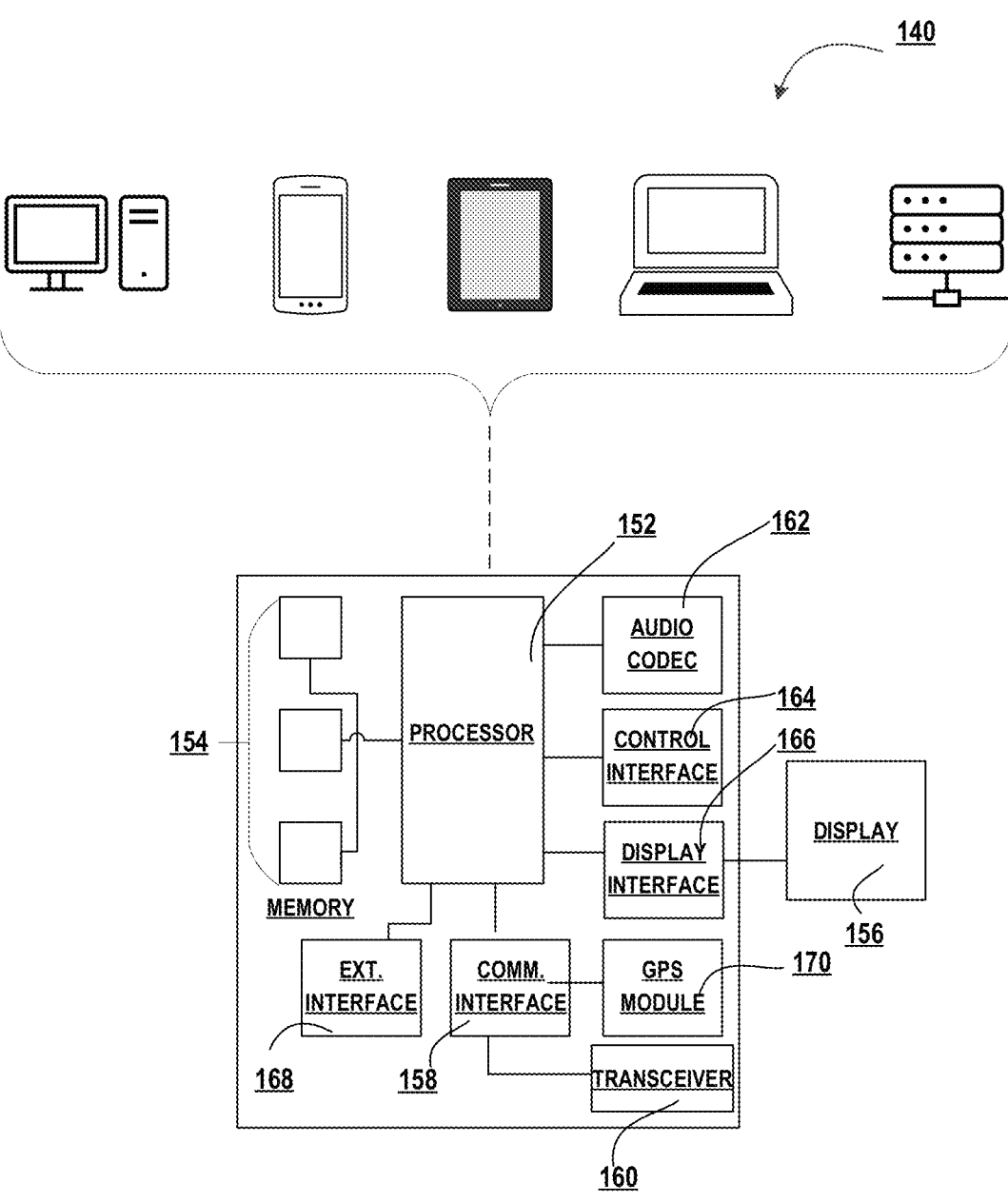
*FIG.* 1C

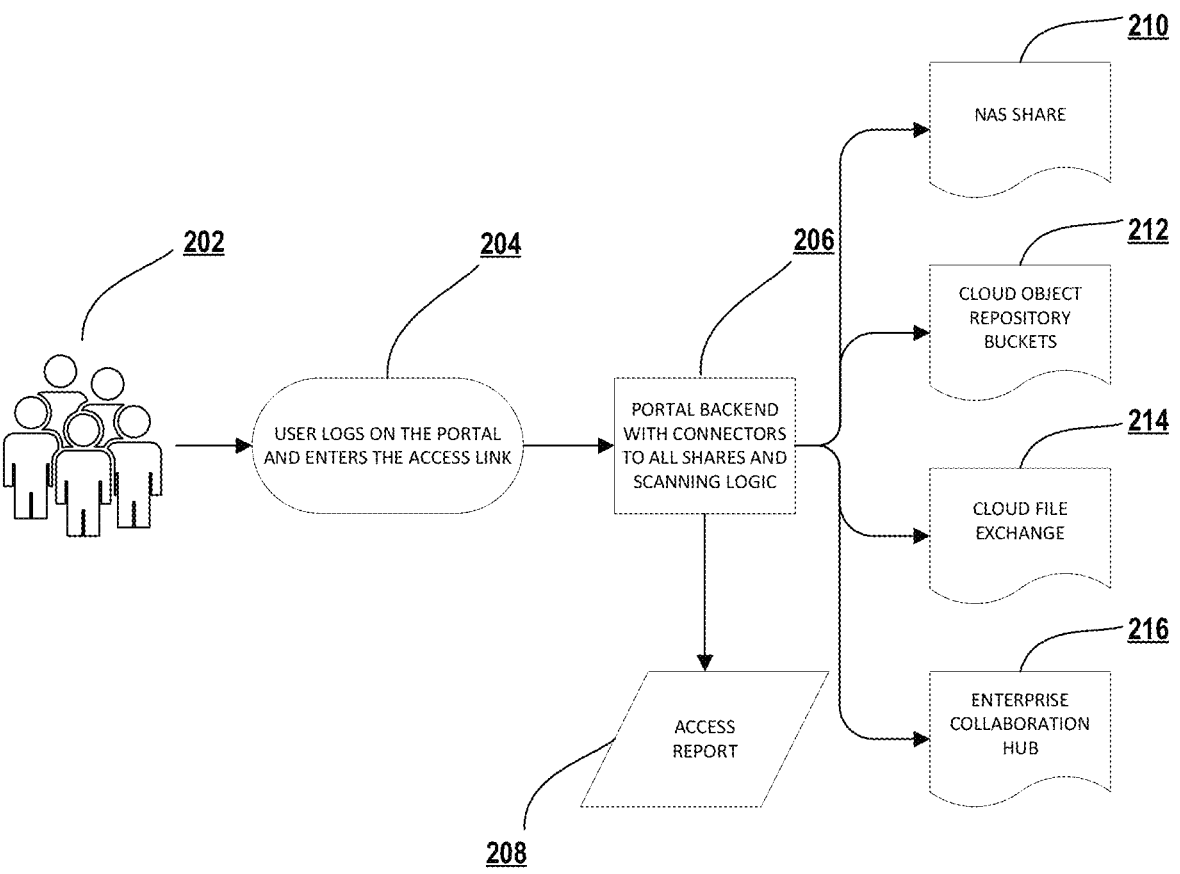
*FIG.* 2

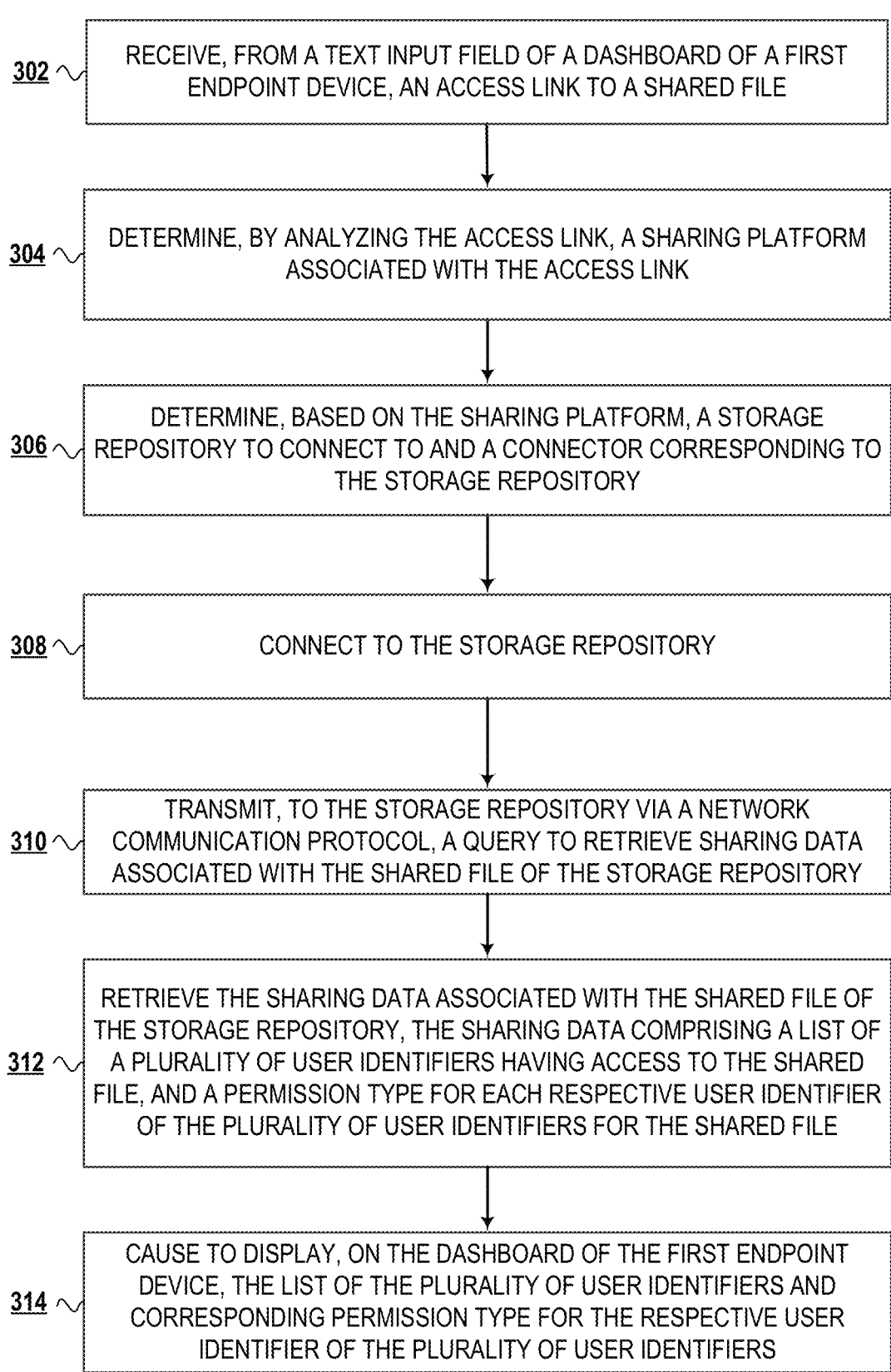

302 ~ RECEIVE, FROM A TEXT INPUT FIELD OF A DASHBOARD OF A FIRST ENDPOINT DEVICE, AN ACCESS LINK TO A SHARED FILE

304 ~ DETERMINE, BY ANALYZING THE ACCESS LINK, A SHARING PLATFORM ASSOCIATED WITH THE ACCESS LINK

306 ~ DETERMINE, BASED ON THE SHARING PLATFORM, A STORAGE REPOSITORY TO CONNECT TO AND A CONNECTOR CORRESPONDING TO THE STORAGE REPOSITORY

308 ~ CONNECT TO THE STORAGE REPOSITORY

310 ~ TRANSMIT, TO THE STORAGE REPOSITORY VIA A NETWORK COMMUNICATION PROTOCOL, A QUERY TO RETRIEVE SHARING DATA ASSOCIATED WITH THE SHARED FILE OF THE STORAGE REPOSITORY

312 ~ RETRIEVE THE SHARING DATA ASSOCIATED WITH THE SHARED FILE OF THE STORAGE REPOSITORY, THE SHARING DATA COMPRISING A LIST OF A PLURALITY OF USER IDENTIFIERS HAVING ACCESS TO THE SHARED FILE, AND A PERMISSION TYPE FOR EACH RESPECTIVE USER IDENTIFIER OF THE PLURALITY OF USER IDENTIFIERS FOR THE SHARED FILE

314 ~ CAUSE TO DISPLAY, ON THE DASHBOARD OF THE FIRST ENDPOINT DEVICE, THE LIST OF THE PLURALITY OF USER IDENTIFIERS AND CORRESPONDING PERMISSION TYPE FOR THE RESPECTIVE USER IDENTIFIER OF THE PLURALITY OF USER IDENTIFIERS

*FIG.* 3A

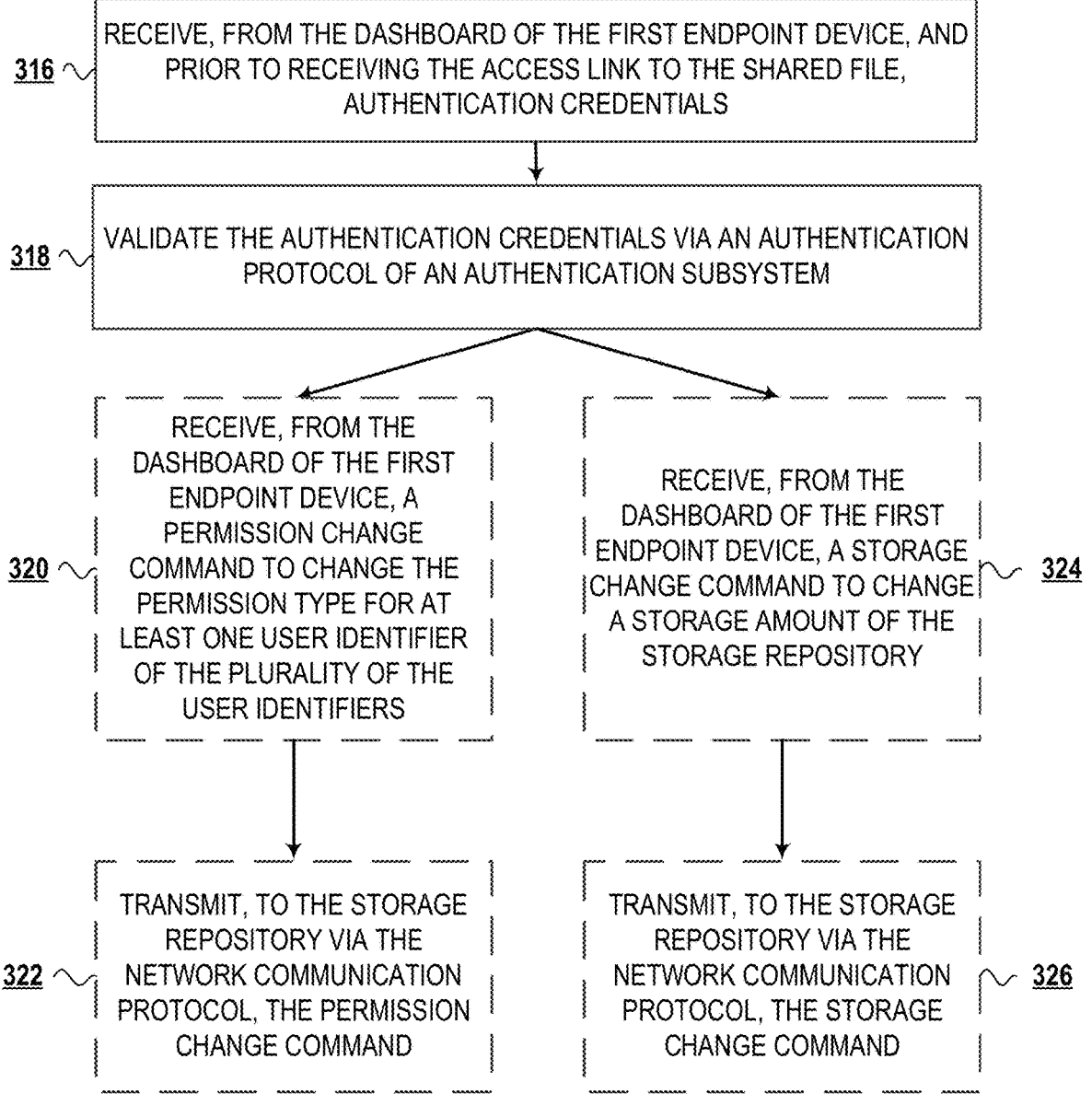

316 — RECEIVE, FROM THE DASHBOARD OF THE FIRST ENDPOINT DEVICE, AND PRIOR TO RECEIVING THE ACCESS LINK TO THE SHARED FILE, AUTHENTICATION CREDENTIALS

318 — VALIDATE THE AUTHENTICATION CREDENTIALS VIA AN AUTHENTICATION PROTOCOL OF AN AUTHENTICATION SUBSYSTEM

320 — RECEIVE, FROM THE DASHBOARD OF THE FIRST ENDPOINT DEVICE, A PERMISSION CHANGE COMMAND TO CHANGE THE PERMISSION TYPE FOR AT LEAST ONE USER IDENTIFIER OF THE PLURALITY OF THE USER IDENTIFIERS

324 — RECEIVE, FROM THE DASHBOARD OF THE FIRST ENDPOINT DEVICE, A STORAGE CHANGE COMMAND TO CHANGE A STORAGE AMOUNT OF THE STORAGE REPOSITORY

322 — TRANSMIT, TO THE STORAGE REPOSITORY VIA THE NETWORK COMMUNICATION PROTOCOL, THE PERMISSION CHANGE COMMAND

326 — TRANSMIT, TO THE STORAGE REPOSITORY VIA THE NETWORK COMMUNICATION PROTOCOL, THE STORAGE CHANGE COMMAND

*FIG.* 3B

SYSTEM AND METHOD FOR MULTI-PROTOCOL DATA PERMISSIONS QUERYING AND AGGREGATION

TECHNOLOGICAL FIELD

Example implementations of the present disclosure relate to a system and method for multi-protocol data permissions querying and aggregation.

BACKGROUND

In modern entities, managing file shares across diverse platforms presents significant challenges due to the variety of storage systems and communication protocols in use. Entities typically use various file storage solutions, such as network-based repositories, cloud-based storage systems, server-managed directories, collaborative platforms, and other restricted-access environments. Each system relies on distinct protocols for communication and managing access permissions, creating a fragmented environment where determining user access rights becomes an administrative burden. This complexity often necessitates involving technical support teams to ascertain access permissions for each file share, thereby complicating security management and reducing operational efficiency. There is a need for a unified solution that simplifies the management of access permissions across heterogeneous file storage environments, reducing administrative overhead and enhancing security controls.

BRIEF SUMMARY

Systems, methods, and computer program products are provided for multi-protocol data permissions querying and aggregation.

In one aspect, a system for multi-protocol data permissions querying and aggregation is presented. The system may include a processing device, and a non-transitory storage device containing instructions, when executed by the processing device, the instructions cause the processing device to perform the steps of receiving, from a text input field of a dashboard of a first endpoint device, an access link to a shared file, determining, by analyzing the access link, a sharing platform associated with the access link, determining, based on the sharing platform, a storage repository to connect to and a connector corresponding to the storage repository, connecting to the storage repository, transmitting, to the storage repository via a network communication protocol, a query to retrieve sharing data associated with the shared file of the storage repository, retrieving the sharing data associated with the shared file, the sharing data including a list of a plurality of user identifiers having access to the shared file, and a permission type for each respective user identifier of the plurality of user identifiers for the shared file, and causing to display, on the dashboard of the first endpoint device, the list of the plurality of user identifiers and corresponding permission type for the respective user identifier of the plurality of user identifiers.

In some implementations, the instructions further cause the processing device to perform the steps of receiving, from the dashboard of the first endpoint device, and prior to receiving the access link to the shared file, authentication credentials, and validating the authentication credentials via an authentication protocol of an authentication subsystem.

In some implementations, the network communication protocol may include the authentication credentials.

In some implementations, upon a first condition the authentication credentials are those of a predetermined superuser group, the instructions further cause the processing device to perform the steps of receiving, from the dashboard of the first endpoint device, a permission change command to change the permission type for at least one user identifier of the plurality of the user identifiers, and transmitting, to the storage repository via the network communication protocol, the permission change command.

In some implementations, upon a first condition the authentication credentials are those of a predetermined superuser group, the instructions further cause the processing device to perform the steps of receiving, from the dashboard of the first endpoint device, a storage change command to change a storage amount of the storage repository, and transmitting, to the storage repository via the network communication protocol, the storage change command.

In some implementations, the permission type is at least one selected from the group consisting of read and write.

In some implementations, the network communication protocol is at least one selected from the group consisting of Hypertext Transfer Protocol, Hypertext Transfer Protocol Secure, Server Message Block, Network File System, Simple Storage Service, and Common Internet Files System.

In another aspect, a computer program product for multi-protocol data permissions querying and aggregation is presented. The computer program product may include a non-transitory computer-readable medium including code causing an apparatus to receive, from a text input field of a dashboard of a first endpoint device, an access link to a shared file, determine, by analyzing the access link, a sharing platform associated with the access link, determine, based on the sharing platform, a storage repository to connect to and a connector corresponding to the storage repository, connect to the storage repository, transmit, to the storage repository via a network communication protocol, a query to retrieve sharing data associated with the shared file of the storage repository, retrieve the sharing data associated with the shared file of the storage repository, the sharing data including a list of a plurality of user identifiers having access to the shared file, and a permission type for each respective user identifier of the plurality of user identifiers for the shared file, and cause to display, on the dashboard of the first endpoint device, the list of the plurality of user identifiers and corresponding permission type for the respective user identifier of the plurality of user identifiers.

In some implementations, the code further causes the apparatus to receive, from the dashboard of the first endpoint device, and prior to receiving the access link to the shared file, authentication credentials, and validate the authentication credentials via an authentication protocol of an authentication subsystem.

In some implementations, the network communication protocol may include the authentication credentials.

In some implementations, upon a first condition the authentication credentials are those of a predetermined superuser group, the code further causes the apparatus to receive, from the dashboard of the first endpoint device, a permission change command to change the permission type for at least one user identifier of the plurality of the user identifiers, and transmit, to the storage repository via the network communication protocol, the permission change command.

In some implementations, upon a first condition the authentication credentials are those of a predetermined superuser group, the code further causes the apparatus to receive, from the dashboard of the first endpoint device, a storage change command to change a storage amount of the storage repository, and transmit, to the storage repository via the network communication protocol, the storage change command.

In some implementations, the permission type is at least one selected from the group consisting of read and write.

In some implementations, the network communication protocol is at least one selected from the group consisting of Hypertext Transfer Protocol, Hypertext Transfer Protocol Secure, Server Message Block, Network File System, Simple Storage Service, and Common Internet Files System.

In yet another aspect, a method for multi-protocol data permissions querying and aggregation is presented. The method may include receiving, from a text input field of a dashboard of a first endpoint device, an access link to a shared file, determining, by analyzing the access link, a sharing platform associated with the access link, determining, based on the sharing platform, a storage repository to connect to and a connector corresponding to the storage repository, connecting to the storage repository, transmitting, to the storage repository via a network communication protocol, a query to retrieve sharing data associated with the shared file of the storage repository, retrieving the sharing data associated with the shared file of the storage repository, the sharing data including a list of a plurality of user identifiers having access to the shared file, and a permission type for each respective user identifier of the plurality of user identifiers for the shared file, and causing to display, on the dashboard of the first endpoint device, the list of the plurality of user identifiers and corresponding permission type for the respective user identifier of the plurality of user identifiers.

In some implementations, the method may further include receiving, from the dashboard of the first endpoint device, and prior to receiving the access link to the shared file, authentication credentials, and validating the authentication credentials via an authentication protocol of an authentication subsystem.

In some implementations, the network communication protocol may include the authentication credentials.

In some implementations, upon a first condition the authentication credentials are those of a predetermined superuser group, the method may further include receiving, from the dashboard of the first endpoint device, a permission change command to change the permission type for at least one user identifier of the plurality of the user identifiers, and transmitting, to the storage repository via the network communication protocol, the permission change command.

In some implementations, upon a first condition the authentication credentials are those of a predetermined superuser group, the method may further include receiving, from the dashboard of the first endpoint device, a storage change command to change a storage amount of the storage repository, and transmitting, to the storage repository via the network communication protocol, the storage change command.

In some implementations, the network communication protocol is at least one selected from the group consisting of Hypertext Transfer Protocol, Hypertext Transfer Protocol Secure, Server Message Block, Network File System, Simple Storage Service, and Common Internet Files System.

The above summary is provided merely for purposes of summarizing some example implementations to provide a basic understanding of some aspects of the present disclosure. Accordingly, it will be appreciated that the above-described implementations are merely examples and should not be construed to narrow the scope or spirit of the disclosure in any way. It will be appreciated that the scope of the present disclosure encompasses many potential implementations in addition to those here summarized, some of which will be further described below.

BRIEF DESCRIPTION OF THE DRAWINGS

Figure 1A:
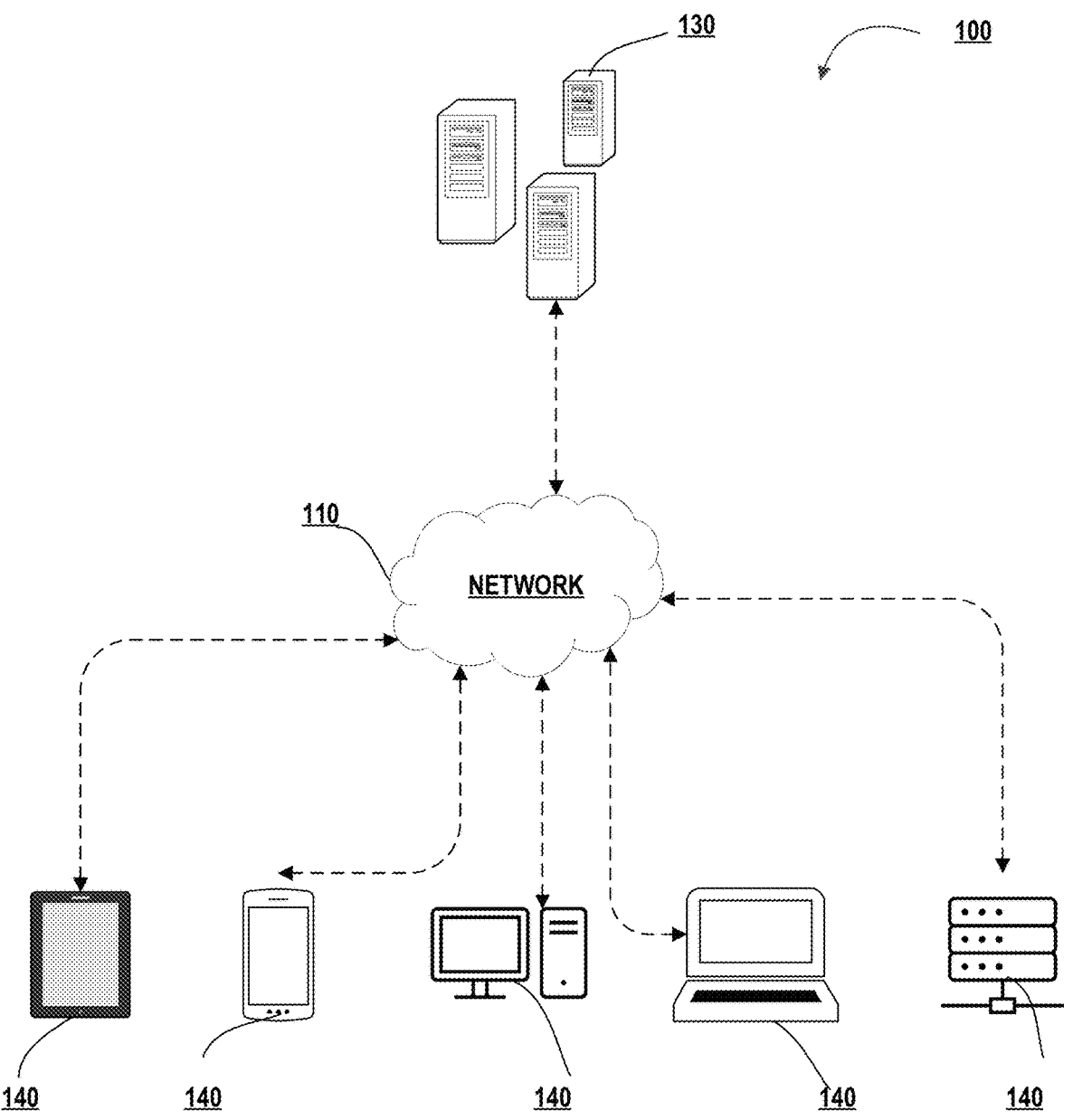

Having thus described implementations of the disclosure in general terms, reference will now be made the accompanying drawings. The components illustrated in the Figures may or may not be present in certain implementations described herein. Some implementations may include fewer (or more) components than those shown in the Figures.

FIGS. 1A-1C illustrate technical components of an exemplary distributed computing environment for multi-protocol data permissions querying and aggregation, in accordance with an implementation of the disclosure;

FIG. 2 illustrates an overview process flow for multi-protocol data permissions querying and aggregation, in accordance with an implementation of the disclosure; and FIGS. 3A-3B illustrate a process flow for multi-protocol data permissions querying and aggregation, in accordance with an implementation of the disclosure.

DETAILED DESCRIPTION

Implementations of the present disclosure will now be described more fully hereinafter with reference to the accompanying drawings, in which some, but not all, implementations of the disclosure are shown. Indeed, the disclosure may be implemented in many different forms and should not be construed as limited to the implementations set forth herein; rather, these implementations are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some implementations, the user may be an individual having past relationships, current relationships or potential future relationships with an entity. In some implementations, the user may be an employee (e.g., an associate, a project manager, an IT specialist, a manager, an administrator, an internal operations analyst, or the like) of the entity or enterprises affiliated with the entity.

As used herein, a "user interface" or "display" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some implementations, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system. In some implementations, an engine may implement a machine learning model to perform functions as a foundation for the larger piece of software that drives the functionality of the software. The machine learning model for any given engine may be self-contained (e.g., without interaction with other engines), or the machine learning model may be shared across one or more engines. In other words, some implementations of the larger piece of software many implement multiple machine learning models to perform functions of the various engines. In other implementations, a single machine learning model may be shared across one or more engines to perform the functions attributed thereto as described herein.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some implementations, the system may be owned or operated by an entity. In such implementations, the entity may employ additional computer systems, such as authentication servers, to validate and certify resources inputted by the plurality of users within the system. The system may further use its authentication servers to certify the identity of users of the system, such that other users may verify the identity of the certified users. In some implementations, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that an element matches a predetermined criterion, including that a threshold has been met, passed, exceeded, and so on.

The technical problem solved herein arises from the disparate nature of file storage systems used within entities, each utilizing different protocols and access control mechanisms for file sharing and permissions management. These systems, which range from network-based repositories and cloud storage to server-based directories and collaborative platforms, operate independently with unique methods for authenticating users and enforcing access controls. As a result, there is no standardized way to query or manage user access rights across these heterogeneous environments. This fragmentation forces administrators to rely on system-specific administrative interfaces and often requires the intervention of technical support teams to manually check, modify, or audit permissions, leading to inefficiencies and potential security gaps. The lack of a centralized solution for managing and synchronizing access control information across multiple systems complicates compliance with security policies, delays incident response, and increases the likelihood of unauthorized access due to inconsistent permission settings and oversight.

Current solutions for managing file shares across diverse storage systems are inadequate because they are often siloed, system-specific, and lack interoperability. Traditional approaches rely on native administrative tools for each storage environment, such as proprietary interfaces or command-line utilities. This fragmentation forces administrators to manage permissions separately for each system, leading to duplicated efforts and increased chances of errors or inconsistencies. Additionally, existing solutions may involve complex scripts or middleware to bridge some gaps, but these are often brittle, difficult to maintain, and require specialized knowledge, making them unreliable for large-scale or dynamic environments. The lack of an integrated solution also complicates auditing and compliance efforts, as security teams cannot easily enforce uniform policies or generate comprehensive reports across all systems. Consequently, entities face increased administrative overhead, security vulnerabilities, and compliance complications due to the inadequacies of current solutions.

Addressing these challenges requires the establishment of a system and method for multi-protocol data permissions querying and aggregation. Such a system provides for the rapid collection and viewing of permissions associated with a shared file, specifically a displaying of all the user identifiers and display of corresponding permissions to read, write, and so forth, the shared file, regardless of the type of shared file access link provided to the system. Moreover, the system may allow for modification of such permissions associated with the shared file in an interface, where modification of these permissions across multiple user identifiers is possible, thus also allowing for the rapid auditing of file access permissions.

To do so, an access link to a shared file, that was input into a text field of a dashboard on a display of an endpoint device, may be received. The access link is analyzed to determine which sharing platform is associated with the access link. In some implementations, prior to receiving the access link to the shared file, authentication credentials may be received and validated. This may be to ensure that only certain users have access to viewing permissions (e.g., read and/or write) or allow for modification of said permissions by a subset of users. Since various sharing platforms may use different storage repositories for the files to be shared, and thus may require different means to connect to these storage repositories, a storage repository to connect to may be determined, and a connector corresponding thereto. After connecting to the storage repository, a query to retrieve sharing data associated with the shared file may be transmitted to the storage repository via a network communication protocol (e.g., Hypertext Transfer Protocol, Hypertext Transfer Protocol Secure, Server Message Block, Network File System, Simple Storage Service, and Common Internet Files System), where the network communication protocol is specific to the sharing platform determined. The sharing data retrieved may include a list of user identifiers (i.e., User IDs) that having access to the shared file, along with permission type(s) for each user identifier. This sharing data may be transformed (e.g., structuring) and displayed onto the dashboard of an endpoint device, such as to allow for quick viewing of the type of permissions granted for a shared file and to whom said permissions were granted. If the authentication credentials were previously collected and are those of a superuser, a permission change command to change the permission type may be received and transmitted to the storage repository via the network communication protocol. Similarly, if authentication credentials were previously collected and are those of a superuser, a storage change command to change a storage amount of the storage repository may be received and transmitted to the storage repository via the network communication protocol.

What is more, the present disclosure provides a technical solution to a technical problem. As described herein, the technical problem includes the lack of a solution for managing and synchronizing access control across disparate file storage systems with different protocols and access mechanisms, leading to inefficiencies, and security and compliance challenges. The present disclosure embraces an improvement over existing solutions by allowing determining shared file access and permissions (i) with fewer steps to achieve the solution (e.g., by detecting the type of protocol necessary to communicate with the architecture related to the access link and avoiding having to try multiple different times with different protocols), thus reducing the amount of network resources, such as processing resources, storage resources, network resources, and/or the like, that are being used, (ii) providing a more accurate solution to problem, thus reducing the number of resources required to remedy any errors made due to a less accurate solution (e.g., by showing shared file access and permissions in a centralized dashboard, allowing for easy auditing and correction of errors in permissions granted), (iii) removing manual input and waste from the implementation of the solution, thus improving speed and efficiency of the process and conserving network resources (e.g., not requiring the manual checking of multi-protocol data permissions querying and aggregation for each link to be performed by a specialized technical administrator, and instead allowing for automated retrieval thereof through a simple copy/paste action), (iv) determining an optimal amount of resources that need to be used to implement the solution, thus reducing network traffic and load on existing network resources (e.g., minimizing redundant efforts to retrieve shared file permissions across system that use various protocols, while also preventing the revocation and subsequent reauthorizing of permissions to only select individuals). In other words, the solution may bypass a series of steps previously implemented, thus further conserving network resources. Furthermore, the technical solution described herein uses a rigorous, computerized process to perform specific tasks and/or activities that were not previously performed.

FIGS. 1A-1C illustrate technical components of an exemplary distributed computing environment 100 for multi-protocol data permissions querying and aggregation, in accordance with an implementation of the disclosure. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an implementation of the distributed computing environment 100, and it will be appreciated that in other implementations one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some implementations, the system 130 and the endpoint device(s) 140 may have a client-server relationship in which the endpoint device(s) 140 are remote devices that request and receive service from a centralized server, i.e., the system 130. In some other implementations, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the afore-mentioned.

The endpoint device(s) 140 may represent various forms of electronic devices, including user input devices such as personal digital assistants, cellular telephones, smartphones, laptops, desktops, and/or the like, input devices such as resource transfer terminals, electronic resource transfer units, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. In addition to shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical intercon-nection technology.

It is to be understood that the structure of the distributed computing environment and its components, connections and relationships, and their functions, are meant to be exemplary only, and are not meant to limit implementations of the disclosures described and/or claimed in this docu-ment. In one example, the distributed computing environ-ment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level struc-ture of the system 130, in accordance with an implementa-tion of the disclosure. As shown in FIG. 1B, the system 130 may include a processing device 102, memory 104, input/output (I/O) device 116, and a storage device 106. The system 130 may also include a high-speed interface 108 connecting to the memory 104, and a low-speed interface 112 connecting to a low-speed bus 114 and a storage device 106. Each of the components 102, 104, 108, 110, and 112 may be operatively coupled to one another using various buses and may be mounted on a common motherboard or in other manners as appropriate. As described herein, the processing device 102 may include a number of subsystems to execute the portions of processes described herein. Each subsystem may be a self-contained component of a larger system (e.g., system 130) and capable of being configured to execute specialized processes as part of the larger system.

The processing device 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processing devices, along with multiple memories, and/or I/O devices, to execute the processes described herein. In other words, as used herein, a "processing device" means one processing device (e.g., a microprocessor) that performs the defined functions or a plurality of processing devices (e.g., microprocessors) that collectively perform defined functions such that the execution of the individual defined functions may be divided amongst such processing devices.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be remov-able. The non-volatile memory may additionally or alterna-tively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly implemented in an information carrier. The computer program product may also contain instructions that, when executed, perform one or more methods, such as those described above. The information carrier may be a non-transitory computer- or machine-readable storage medium, such as the memory 104, the storage device 106, or memory on processing device 102.

The high-speed interface 108 manages bandwidth-inten-sive operations for the system 130, while the low-speed controller 112 manages lower bandwidth-intensive opera-tions. Such allocation of functions is exemplary only. In some implementations, the high-speed interface 108 is coupled to memory 104, input/output (I/O) device 116 (e.g., through a graphics processor or accelerator), and to high-speed expansion ports 111, which may accept various expan-sion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be imple-mented as a standard server, or multiple times in a group of such servers. Additionally, the system 130 may also be implemented as part of a rack server system or a personal computer such as a laptop computer. Alternatively, compo-nents from system 130 may be combined with one or more other same or similar systems and an entire system 130 may be made up of multiple computing devices communicating with each other.

FIG. 1C illustrates an exemplary component-level structure of the endpoint device(s) 140, in accordance with an implementation of the disclosure. As shown in FIG. 1C, the endpoint device(s) 140 includes a processing device 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processing device 152 is configured to execute instructions within the endpoint device(s) 140, including instructions stored in the memory 154, which in one implementation includes the instructions of an application that may perform the functions disclosed herein, including certain logic, data processing, and data storing functions. The processing device may be implemented as a chipset of chips that include separate and multiple analog and digital processors. The processing device may be configured to provide, for example, for coordination of the other components of the endpoint device(s) 140, such as control of user interfaces, applications run by endpoint device(s) 140, and wireless communication by endpoint device(s) 140.

The processing device 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processing device 152. In addition, an external interface 168 may be provided in communication with processing device 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory Module) card interface. Such expansion memory may provide extra storage space for endpoint device(s) 140 or may also store applications or other information therein. In some implementations, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly implemented in an information carrier. The computer program product contains instructions that, when executed, perform one or more methods, such as those described herein. The information carrier is a computer- or machine-readable medium, such as the memory 154, expansion memory, memory on processing device 152, or a propagated signal that may be received, for example, over transceiver 160 or external interface 168.

In some implementations, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to endpoint device(s) 140, which may be used as appropriate by applications running thereon, and in some implementations, one or more applications operating on the system 130.

The endpoint device(s) 140 may also communicate audibly using audio codec 162, which may receive spoken information from a user and convert the spoken information to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some implementations, one or more applications operating on the system 130.

Various implementations of the distributed computing environment 100, including the system 130 and endpoint device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a high-level flow diagram for multi-protocol data permissions query and aggregation, in accordance with an implementation of the disclosure. Users 202 may interact with an endpoint device, logging onto a portal and entering a path (i.e., link) to the shared file (i.e., the "share") as illustrated in block 204. A connection is made to portal backend with connections to all shared files and scanning logic at block 206, which leverages operable communication with various protocols and associated backend architecture, in including network attached storage 210, cloud object repository buckets 212, cloud file exchange 214, and enterprise collaboration hub 216.

FIGS. 3A-3B illustrate a process flow for multi-protocol data permissions querying and aggregation, in accordance with an implementation of the disclosure. At block 302 of FIG. 3A, the system may receive, from a text input field of a dashboard of a first endpoint device, an access link to a shared file.

In some implementations, a dashboard may be displayed on an interface of an endpoint device with a text box for receiving text, the text being the access link related to a shared file, the shared file being that which is the subject of the permissions query by the system herein. The insertion (e.g., via copy/paste or otherwise) of the access link into the text box may automatically result in the initiation of one or more of the process steps discussed hereinafter. Alternatively, after insertion of the access link into the text box, the initiation of the one or more process steps discussed hereinafter may occur upon interacting with an interaction element (e.g., a "submit" button or the like).

In other implementations, an interactive menu element may be provided as a result of integrating the system into an operating system of an endpoint device. For example, right-clicking on an access link may provide for a button to "query permissions", the selection of such interactive element resulting in the initiating of one or more of the process steps discussed hereinafter.

While in some implementations, the access link may be received from any user at an endpoint device operatively coupled to the present system, in other implementations, special user credentials may be required to perform subsequent tasks. Turning now to FIG. 3B, as such, at block 316 the system may receive authentication credentials input into the dashboard of the first endpoint device. These authentication credentials may be received before or after receiving the access link to the shared file from the dashboard of the first endpoint device.

Next, at block 318, the system may validate the authentication credentials via an authentication protocol of an authentication subsystem. If the authentication credentials meet predetermined requirements such as a user identifier within a predetermined user group, for example, a user group deemed to be "superusers" may refer to users of a group who possess elevated privileges or administrative access within the system, which allows superusers to perform tasks and access resources that are typically restricted to regular users. This may include, but is not limited to, the ability to manage user accounts, modify system configurations (e.g., shared file permissions, storage allocation, etc.), access sensitive data, execute system-level commands, or the like.

In some implementations, if authentication credentials not belonging to a (predetermined) superuser group are not received, the system may prevent any inquiry into the access link (e.g., by refusing entry of the access link into the dashboard or refusing to proceed with any of the subsequent steps described hereinafter).

Returning to FIG. 3A, at block 304, the system may determine, by analyzing the access link, a sharing platform associated with the access link. After receiving the link, the system may implement one or more of several pattern recognition and string-matching techniques.

It shall be appreciated that access links generated for sharing of files have distinct characteristics that reflect the underlying sharing platform used, four of which are described hereinafter, but in no way shall be considered limiting to the disclosure, as the techniques described are applicable to any file sharing platform that produces access links unique to said file sharing platform.

As used herein, a "network attached storage" system or "NAS" may refer to a dedicated file storage device that connects to a network and allows multiple users and devices to access, share through a file sharing platform, and manage data centrally. An NAS may include various configurations, including single or multiple drive systems, and may support different file sharing protocols such as SMB/CIFS, NFS, or AFP, depending on the implementation and specific use case.

As used herein, a "cloud object repository" may refer to a scalable, web-based storage service and sharing platform that allows users to store and retrieve data in the form of objects, which are organized within containers or buckets. The cloud object repository may be accessible over the internet and may be used for various purposes, including data archiving, backup, content distribution, and storage for web applications. The cloud object repository supports various storage classes designed to improve cost and performance based on the frequency of data access and retrieval speed requirements.

As used herein, "cloud file exchange" may refer to an online service and sharing platform that enables users to store, manage, and share files across multiple devices and with other users over the internet. The cloud file exchange may provide synchronized access to files through a web-based interface or dedicated applications. The cloud file exchange may allow for collaborative editing, version control, etc. The cloud file exchange may include features such as access permissions, file sharing links, and integration with various productivity tools.

As used herein, an "enterprise collaboration hub" may refer to a centralized secure and scalable framework and sharing platform for entities to facilitate document management and internal communication that allows for users to create, store, share, and edit documents and other content within a structured environment, often organized into sites or workspaces. An enterprise collaboration hub may also provide integration with various enterprise applications and provide tools for managing access permissions and content versioning.

Indeed, access links generated for sharing of files using the foregoing sharing platforms each have distinct characteristics unique to the particular sharing platform used. These distinct characteristics may be leveraged by the system described herein to determine the sharing platform without any additional information beyond the access link itself.

NAS access links may appear as network paths or local IP addresses, such as \\192.168.1.10\sharedfolder or http://nasname.local/sharedfolder, and are typically, though not always, accessible only within a local network unless remote access is configured.

Cloud object repository access links may include a top level domain corresponding to the cloud object repository service in the URL, often with the bucket name as a subdomain or part of the path, like https://bucketname.x3.(domain).com/filename. These access links may also include query parameters for permissions or expiration times.

A cloud file exchange generates access links that may include the service's domain, for example, https://drive.(domain).com/file/d/ . . . or https://www.(domain).com/s/ . . . . Some cloud file exchanges may include a unique identifier embedded in the access link.

Enterprise collaboration hub access links may be distinguished by the inclusion of (domain).com and the entity's domain as a subdomain, such as https://yourdomain.(domain).com/ . . . . The URL may mirror the structure of the enterprise collaboration hub site and be structured with segments for document libraries and folders.

The access link received may be tokenized into its constituent parts, such as individual characters, sequences of letters, or groups of numbers. These tokens may then be analyzed based on predefined rules or patterns that the system recognizes.

In some implementations, the system may search for specific sequences, such as "ABC123" or "&&%", or it may be configured to identify patterns like hexadecimal numbers, email addresses, or specific combinations of symbols. The system may match patterns within the text, such as identifying all instances of a certain letter followed by a number, or sequences of digits that conform to a specific format.

To determine the sharing platform associated with the access link, the system may search for predetermined sequences, numbers, or the like. For example, identifying via search that the term represented in the foregoing as "bucketname" is within the access link may be associated with the cloud object repository. Identifying via search the entity's domain name within the access link may be associated with an enterprise collaboration hub. Identifying via search a services domain name or the term "drive" within the access link may be associated with a cloud file exchange. Identifying via search an IP address or name of the NAS within an access link may be associated with a network attached storage system.

Upon simple identification of one of these predetermined sequences, the system may assume that the access link is associated with the corresponding sharing platform. In other implementations, a machine learning model may be implemented to make inferences to the type of sharing platform with which the access link is associated. The machine learning model may be implemented in the system.

The input layer of the machine learning model may receive the sequences from the access link, which are tokenized into words, characters, or sub-word units using pre-processing steps such as splitting on delimiters or applying regular expressions. The sequences may then be transformed into dense vector representations via an embedding layer, mapping each token to a multi-dimensional vector that captures semantic relationships between tokens, using either pre-trained embeddings or embeddings learned during training.

The model architecture may include Recurrent Neural Networks (RNNs), such as Long Short-Term Memory (LSTM) or Gated Recurrent Units (GRU), which process sequential data and capture dependencies across tokens; Convolutional Neural Networks (CNNs), which extract local features from the sequences; or Transformer Networks, which utilize self-attention mechanisms to capture relationships between tokens across the entire sequence, regardless of position.

Intermediate layers may include additional dense layers, attention mechanisms, or normalization layers designed to refine the representations learned by the model and improve inference accuracy.

The output layer may produce the final prediction or inference, which may be a classification label of the sharing platform, a probability distribution over potential categories of sharing platforms, or a regression output.

The ML model may trained on a labeled dataset consisting of access links paired with their identification of sharing platform, such as category labels or classifications. Training involves data collection, pre-processing, defining a loss function, optimizing model parameters using backpropagation and an optimizer such as Stochastic Gradient Descent (SGD) or Adam, and validating the model's performance on a separate dataset to ensure generalization to unseen data. Hyperparameter tuning may be used to further improve the model's performance.

In some implementations, if the access link contains structured data, like serial numbers or codes, the system may include a validation step, where it checks whether these sequences conform to expected formats, such as a checksum or specific length. In cases where the text is entirely unstructured, the system might apply statistical or machine learning models to classify or categorize the sequences based on patterns learned from similar data.

In some implementations, the system may also perform operations like sorting, filtering, or extracting specific substrings based on the identified patterns.

Continuing at block 306, the system may determine, based on the sharing platform, a storage repository to connect to and a connector corresponding to the storage repository. It shall be appreciated that sharing platforms, especially when multiple sharing platforms are implemented in a computing environment of an entity, each may utilize storage a repository, or repositories, specific to said sharing platform. In other words, a file that is shared via an enterprise collaboration hub may refer to a file in Repository A, while a file that is shared via cloud object repository may refer to a file in Repository B, and so forth.

Specifically, as non-limiting examples, NAS may use on-premises storage repositories like traditional file systems such as NTFS or ext4, housed in dedicated hardware devices connected to the organization's local network. These repositories may be physically located within the entity infrastructure, providing direct control over data management and access. Enterprise collaboration hubs, on the other hand, may use storage repositories within cloud infrastructure, where such files are held within SQL Server databases or Blob storage within data centers. These repositories may be part of a larger, distributed system. Cloud object repository buckets systems may use an object storage repository, where files are stored as objects within "buckets" across a cloud infrastructure. Each object may include the data itself, metadata, and a unique identifier, all stored within a flat namespace. Cloud file exchanges may use a multi-tenant cloud storage repository within $3^{rd}$ party data centers, where files may be stored as objects within a storage infrastructure using a distributed file system.

Thus, repositories may have addresses and methods of communication that are specific to the type of sharing platform. And, based on the sharing platform determined by the system, connecting to said repository and communicating therewith may require protocols tailored for each sharing platform.

For NAS, the repository is located within the local network and is accessed via network protocols like SMB (Server Message Block) or NFS (Network File System), using an IP address or network path (e.g., \server\share). The repository location may be defined by the LAN's addressing scheme and is governed by the organization's network and file system permissions. Enterprise collaboration hub repositories are hosted on web platforms and are accessed through URLs. The repository location may be defined by its URL structure, with the underlying data stored in SQL databases or Blob storage. Cloud object repositories are organized into buckets with files stored as objects within the cloud infrastructure. Similarly, cloud file exchange repositories may be defined by their URL structure.

Using the aforementioned specifics regarding where to communicate with a storage repository, at block 308, the system may connect to the storage repository associated with the sharing platform. The system may be pre-programmed with the necessary protocols, APIs, authentication methods (network communication protocols are discussed relative to block 310, but may be also implemented in block 308), and data access patterns for each of the communication requirements and storage repository locations, with each of these communication requirements and storage repository locations associated with their respective sharing platform in a database for reference by the system.

Next, at block 310, the system may transmit a query to retrieve sharing data associated with the shared file of the storage repository. The query may be transmitted to the storage repository via a network communication protocol. Based on the sharing platform determined by the system, connecting to said repository and communicating therewith may require communication protocols tailored for each sharing platform.

In some implementations, the network communication protocol may be Hypertext Transfer Protocol, Hypertext Transfer Protocol Secure, Server Message Block, Network File System, Simple Storage Service, and Common Internet Files System.

For NAS, the repository may be accessed via network protocols like SMB (Server Message Block) or NFS (Network File System), using an IP address or network path (e.g., \\server\share) within the local network. The communication may use the LAN's addressing scheme, with access controlled by the organization's network and file system permissions. Enterprise collaboration hub repositories may be accessed through URLs (e.g., https://companyname.(x).com/sites/sitename). Communication occurs over HTTPS, and access may be managed via an enterprise collaboration hub web-based interface, APIs, or integration with other services. Cloud object repository buckets use an addressing scheme based on bucket names and object keys. Each file is stored as an object in a bucket, and accessed via a URL or through SDKs/APIs. The communication may be handled over HTTP/HTTPS, and it may use RESTful APIs or CLI for interactions. Cloud file exchanges may also use URLs to access repositories. Each file or folder may have a unique identifier, and is accessed via URLs. Communication may occur over HTTPS, and applications interact with the repository via an API.

The sharing data may include a list of a plurality of user identifiers having access to the shared file, a permission type for each respective user identifier of the plurality of user identifiers for the shared file, or the like. In some implementations, the sharing data may be metadata.

In some implementations, the sharing platform may provide an API that can be used by the system to retrieve the sharing data. The system makes an API call to retrieve the sharing data associated with the shared file. In some implementations, the system, acting as an administrator, may be issued an OAuth token. The system may first authenticate with the sharing platform using admin credentials and request an OAuth token with elevated permissions. Because of the administrative role, the sharing platform may issue an OAuth token that grants access to the shared file. With the OAuth token, the system may make API calls to retrieve the sharing data.

In some implementations, a network communication using the network communication protocol may include the authentication credentials provided to the system in block 316. Some APIs may require authentication to ensure that only authorized users can access specific resources. Additionally, or alternatively, for servers utilizing HTTP basic or digest authentication, authentication credentials may be included in the request header to authenticate the client. Additionally, or alternatively, in systems using OAuth, an authentication credentials may be required in the request headers to maintain a secure session with the server and/or to access the shared data. Additionally, or alternatively, if mutual TLS is implemented, a client certificate must be provided during the SSL/TLS handshake to authenticate the client to the server.

At block 312, the system may retrieve the sharing data associated with the shared file of the storage repository using the query transmitted at block 310.

In addition to retrieving data regarding user identifiers (i.e., users) with which the shared file has been shared, the system may also retrieve data regarding the permissions each user identifier with which the shared file has been shared has been granted. In some implementations, the permission type may be read (i.e., read only), write (i.e., read/write), restricted access (i.e., no access), or the like. In other words, any given shared file may have numerous user identifiers with which the shared file has been shared, with some users having read-only permissions, while other user identifiers may have read and write permissions (i.e., the ability to modify the file in one or more ways).

Next, at block 314, the system may cause to display the list of the plurality of user identifiers on the dashboard of the first endpoint device. Additionally, or alternatively, the system may cause to display the list of the corresponding permission type for the respective user identifier of the plurality of user identifiers.

Now with reference to FIG. 3B, at block 320, in some implementations, the system may receive a permission change command to change the permission type for at least one user identifier of the plurality of the user identifiers. The permission change command may be received from the dashboard of the first endpoint device, and may include changing the permission to the shared file for one or more user identifiers from (i) read only to write, (ii) from write to read only, (iii) from no access/restricted access to write, (iv) from no access/restricted access to read only, (v) from read only to no access/restricted access, (vi) from write to no access/restricted access, or the like.

In some implementations, the permission change command may be implemented only upon a first condition where the authentication credentials received at block 316 are those of a predetermined superuser group. In other implementations, the authentication credentials received, if received at all, may not be required to belong to any particular group, and the permission change command may be implemented regardless of any authentication credentials.

Next, at block 322, the system may transmit the permission change command to the storage repository via the network communication protocol in order to implement the permission change according to that which was specified at block 320.

Additionally, or alternatively to the permission change command of block 320, the system may, as illustrated in block 324, receive a storage change command to change a storage amount of the storage repository.

The storage change command may be received from the dashboard of the first endpoint device, and may include changing the storage allocated to the shared file in the storage repository (i) to increase the amount of storage allocated to the shared file, or (ii) decrease the amount of storage allocated to the shared file, or the like.

In some implementations, the storage change command may be implemented only upon a first condition where the authentication credentials received at block 316 are those of a predetermined superuser group. In other implementations, the authentication credentials received, if received at all, may not be required to belong to any particular group, and the storage change command may be implemented regardless of any authentication credentials.

At block 326, the system may transmit the storage change command to the storage repository via the network communication protocol in order to implement the storage change according to that which was specified at block 324.

As will be appreciated by one of ordinary skill in the art, the present disclosure may be implemented as an apparatus (including, for example, a system, a machine, a device, a computer program product, and/or the like), as a method (including, for example, an enterprise process, a computer-implemented process, and/or the like), as a computer program product (including firmware, resident software, microcode, and the like), or as any combination of the foregoing. Many modifications and other implementations of the present disclosure set forth herein will come to mind to one skilled in the art to which these implementations pertain having the benefit of the teachings presented in the foregoing descriptions and the associated drawings. Although the Figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system for multi-protocol data permissions querying and aggregation, the system comprising:
a processing device; and
a non-transitory storage device containing instructions, when executed by the processing device, the instructions cause the processing device to perform the steps of:
receiving, from a text input field of a dashboard of a first endpoint device, an access link to a shared file;
determining, by analyzing the access link, a sharing platform associated with the access link;
determining, based on the sharing platform, a storage repository to connect to and a connector corresponding to the storage repository;
connecting to the storage repository;
transmitting, to the storage repository via a network communication protocol, a query to retrieve sharing data associated with the shared file of the storage repository;
retrieving the sharing data associated with the shared file, the sharing data comprising a list of a plurality of user identifiers having access to the shared file, and a permission type for each respective user identifier of the plurality of user identifiers for the shared file; and
causing to display, on the dashboard of the first endpoint device, the list of the plurality of user identifiers and corresponding permission type for the respective user identifier of the plurality of user identifiers.

2. The system of claim 1, wherein the instructions further cause the processing device to perform the steps of:
receiving, from the dashboard of the first endpoint device, and prior to receiving the access link to the shared file, authentication credentials; and
validating the authentication credentials via an authentication protocol of an authentication subsystem.

3. The system of claim 2, wherein the network communication protocol comprises the authentication credentials.

4. The system of claim 2, wherein, upon a first condition the authentication credentials are those of a predetermined superuser group, the instructions further cause the processing device to perform the steps of:
receiving, from the dashboard of the first endpoint device, a permission change command to change the permission type for at least one user identifier of the plurality of the user identifiers; and
transmitting, to the storage repository via the network communication protocol, the permission change command.

5. The system of claim 2, wherein, upon a first condition the authentication credentials are those of a predetermined superuser group, the instructions further cause the processing device to perform the steps of:
receiving, from the dashboard of the first endpoint device, a storage change command to change a storage amount of the storage repository; and
transmitting, to the storage repository via the network communication protocol, the storage change command.

6. The system of claim 1, wherein the permission type is at least one selected from the group consisting of read and write.

7. The system of claim 1, wherein the network communication protocol is at least one selected from the group consisting of: Hypertext Transfer Protocol, Hypertext Transfer Protocol Secure, Server Message Block, Network File System, Simple Storage Service, and Common Internet Files System.

8. A computer program product for multi-protocol data permissions querying and aggregation, the computer program product comprising a non-transitory computer-readable medium comprising code causing an apparatus to:

receive, from a text input field of a dashboard of a first endpoint device, an access link to a shared file;

determine, by analyzing the access link, a sharing platform associated with the access link;

determine, based on the sharing platform, a storage repository to connect to and a connector corresponding to the storage repository;

connect to the storage repository;

transmit, to the storage repository via a network communication protocol, a query to retrieve sharing data associated with the shared file of the storage repository;

retrieve the sharing data associated with the shared file of the storage repository, the sharing data comprising a list of a plurality of user identifiers having access to the shared file, and a permission type for each respective user identifier of the plurality of user identifiers for the shared file; and cause to display, on the dashboard of the first endpoint device, the list of the plurality of user identifiers and corresponding permission type for the respective user identifier of the plurality of user identifiers.

9. The computer program product of claim 8, wherein the code further causes the apparatus to:

receive, from the dashboard of the first endpoint device, and prior to receiving the access link to the shared file, authentication credentials; and validate the authentication credentials via an authentication protocol of an authentication subsystem.

10. The computer program product of claim 9, wherein the network communication protocol comprises the authentication credentials.

11. The computer program product of claim 9, wherein, upon a first condition the authentication credentials are those of a predetermined superuser group, the code further causes the apparatus to:

receive, from the dashboard of the first endpoint device, a permission change command to change the permission type for at least one user identifier of the plurality of the user identifiers; and transmit, to the storage repository via the network communication protocol, the permission change command.

12. The computer program product of claim 9, wherein, upon a first condition the authentication credentials are those of a predetermined superuser group, the code further causes the apparatus to:

receive, from the dashboard of the first endpoint device, a storage change command to change a storage amount of the storage repository; and transmit, to the storage repository via the network communication protocol, the storage change command.

13. The computer program product of claim 8, wherein the permission type is at least one selected from the group consisting of read and write.

14. The computer program product of claim 8, wherein the network communication protocol is at least one selected from the group consisting of: Hypertext Transfer Protocol, Hypertext Transfer Protocol Secure, Server Message Block, Network File System, Simple Storage Service, and Common Internet Files System.

15. A method for multi-protocol data permissions querying and aggregation, the method comprising:

receiving, from a text input field of a dashboard of a first endpoint device, an access link to a shared file;

determining, by analyzing the access link, a sharing platform associated with the access link;

determining, based on the sharing platform, a storage repository to connect to and a connector corresponding to the storage repository;

connecting to the storage repository;

transmitting, to the storage repository via a network communication protocol, a query to retrieve sharing data associated with the shared file of the storage repository;

retrieving the sharing data associated with the shared file of the storage repository, the sharing data comprising a list of a plurality of user identifiers having access to the shared file, and a permission type for each respective user identifier of the plurality of user identifiers for the shared file; and causing to display, on the dashboard of the first endpoint device, the list of the plurality of user identifiers and corresponding permission type for the respective user identifier of the plurality of user identifiers.

16. The method of claim 15, the method further comprising:

receiving, from the dashboard of the first endpoint device, and prior to receiving the access link to the shared file, authentication credentials; and validating the authentication credentials via an authentication protocol of an authentication subsystem.

17. The method of claim 16, wherein the network communication protocol comprises the authentication credentials.

18. The method of claim 16, wherein, upon a first condition the authentication credentials are those of a predetermined superuser group, the method further comprises:

receiving, from the dashboard of the first endpoint device, a permission change command to change the permission type for at least one user identifier of the plurality of the user identifiers; and transmitting, to the storage repository via the network communication protocol, the permission change command.

19. The method of claim 16, wherein, upon a first condition the authentication credentials are those of a predetermined superuser group, the method further comprises:

receiving, from the dashboard of the first endpoint device, a storage change command to change a storage amount of the storage repository; and transmitting, to the storage repository via the network communication protocol, the storage change command.

20. The method of claim 15, wherein the network communication protocol is at least one selected from the group consisting of: Hypertext Transfer Protocol, Hypertext Transfer Protocol Secure, Server Message Block, Network File System, Simple Storage Service, and Common Internet Files System.

* * * * *